H. P. GOULD.
ADVERTISING MEDIUM.
APPLICATION FILED NOV. 13, 1913.
1,166,900.
Patented Jan. 4, 1916.
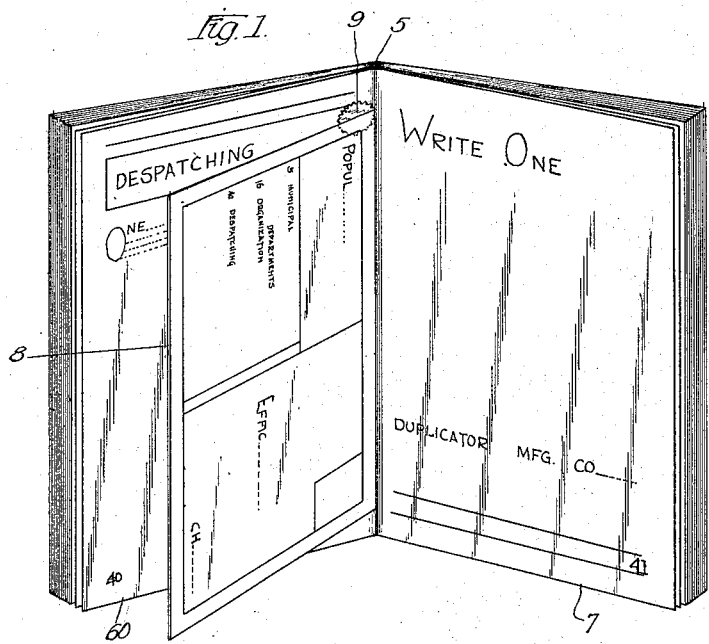
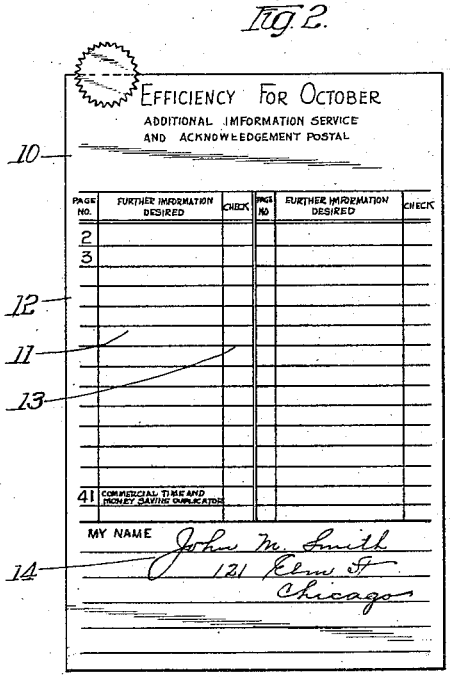
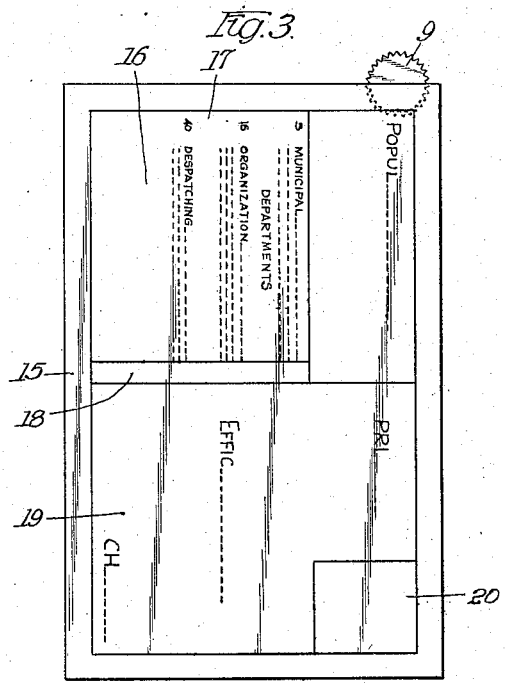

UNITED STATES PATENT OFFICE.

HAROLD P. GOULD, OF CHICAGO, ILLINOIS.

ADVERTISING MEDIUM.

1,166,900.

Specification of Letters Patent.

Patented Jan. 4, 1916.

Application filed November 13, 1913. Serial No. 800,728.

*To all whom it may concern:*

Be it known that I, HAROLD P. GOULD, a citizen of the United States, residing at Chicago, in the county of Cook and State of Illinois, have invented certain new and useful Improvements in Advertising Mediums, of which the following is a specification.

My invention relates broadly to means, through the medium of a card or like agency, for increasing the advertising value of a book or other publication and for procuring a vote from the readers thereof as to the articles or topics in the book or publication so that it may be edited with a view of giving to the readers such articles as are desired by the majority.

So far as I am aware there is no reasonably certain method of ascertaining approximately the number of sales that are made by one or more advertisments in a publication, which is unsatisfactory both to the managers of the publication and the manufacturers, as the former cannot compile accurate data as to the advertising value of a publication and the latter may never know whether the advertisment within a certain publication was the cause of increased sales. The practical and theoretically successful publication is the one that increases its circulation by reason of the high character of the text contained therein and whose system is such that accurate data can be compiled as to the advertising value of the space within said publication for advertising purposes. To these ends, therefore, I have devised an advertising card or like medium to be made a part of or associated with a book or publication in such a convenient and attractive manner that a reader will use the card for the purpose for which it is intended and in doing so furnishes the owner of such book or publication with the necessary data for ascertaining the advertising value of the publication and the general subject-matter of the topics or articles which the majority of the readers desire. These ends are accomplished by the advertising card shown in the accompanying drawing, in which—

Figure 1 is a front perspective view of a book with my advertising medium therein; Fig. 2 is a front view of my advertising medium; Fig. 3 is a rear view of my advertising medium.

Referring now more particularly to the drawing, a book or other form of publication 5, having consecutively numbered pages, page 40 thereof being indicated by the numeral 60, page 41 by the numeral 7, contains instructive articles as well as advertisements; for instance, on page 40 is printed an article relating to "despatching"; whereas, on page 41 is an advertisement of a machine. Between pages 40 and 41, or at any other convenient place in the publication, an advertising medium 8 is inserted which may be detachably secured to the publication by means of a sticker or seal 9.

In the invention as illustrated, the advertising medium is in the form of a postal card, preferably bearing the name and address of the publication to which it is attached and stamped ready for mailing. Upon one side 10 of the advertising medium 8 is printed an index of advertisements, the name of the advertised article being printed in column 11, the number of the page in the publication upon which a certain advertisement appears being printed in the column 12, and column 13 is designed for check marks for checking one or more of the advertisements. A suitable space 14 is left for the name and address of the party interested in the advertisement to be checked by the reader of the publication. Of course it is understood that information other than advertisements appearing in the publication may be inserted in any one of the spaces provided. Upon the opposite side 15 of the advertising medium a column of spaces 16 is arranged within which is printed an index of the instructive articles appearing in the publication and in the column 17 are numerals designating the page upon which a certain article appears. The column 18 is left for checking opposite one or more of the instructive articles and the space 19 is adapted to contain the printed name and address of the publication which the advertising medium forms a part of. The space 20 is designed for a stamp.

The invention is used as follows: If the reader of the publication is interested in any advertisement contained therein, such reader places a check mark opposite the advertised article in column 11, or opposite such other item as may be in said column. If the reader is particularly interested in any instructive article within the publication a check mark is placed opposite the title of the instructive article in column 16. The reader then places his name and address in the space indicated at 14. As it is intended that the advertising medium shall be addressed to the publication and should also be stamped, all the reader has to do is to place the check marks, write his name and address and mail the postal card, since it is easily detachable from the publication by breaking the seal 9.

The advantages derived from this form of advertising medium are these: First, the advertising medium is so conveniently presented to the reader that it may be filled in and mailed with practically no loss of time. Second, the editor of the publication procures accurate data in the form of the name and address of the reader interested in a certain advertisement and can convey such information to the company advertising in the publication, thereby showing direct results to the advertiser, and, consequently, enhancing the value of the advertising space within the magazine. Third, the reader's opinion is solicited on the character of the instructive articles desired and the editor may be governed according to the majority of opinions of the readers checking the advertising medium in each publication.

It is obvious that the particular arrangement of the index upon the advertising medium constitutes no part of my invention so long as the full index is present and Without, therefore, confining myself to the arrangement of spaces shown, I claim:

1. A publication having leaves bearing printed data constituting advertising matter of different advertising concerns, and a part on which is a list of said advertisements adapted to be checked by the reader to indicate the advertisements in which he is interested, the part being detachably carried by the publication and bearing an address of a common point of distribution to which it is to be returned when removed irrespective of the special checking of the list, and said list having its items designated by numerals indicative of the page numbers of the publication on which said items are located so that said list normally constitutes the publication index for its advertisements.

2. A publication having leaves bearing printed data constituting advertising matter of different advertising concerns, and a part on which is a list of said advertisements adapted to be checked by the reader to indicate the advertisement in which he is interested, a supplemental list on said part indicating the subjects matter of articles constituting other portions of the contents of the publication adapted to be checked to indicate the preference of the reader, and said part being detachably carried by the publication and bearing an address of a common point of distribution to which it is to be returned when removed irrespective of the special checking of the list, both said first mentioned and supplemental lists having their items designated by numerals indicative of the page numbers of the publication on which said items are located so that said list normally constitutes the publication index for its advertising and subject matter contents.

HAROLD P. GOULD.

Witnesses:
    FRED D. SUMMERS,
    FRED E. TRACY.

Copies of this patent may be obtained for five cents each, by addressing the "Commissioner of Patents, Washington, D. C."